March 11, 1930.  A. SCHMÜCKING  1,750,364

SEPARATOR DRUM

Filed Oct. 19, 1928

Inventor
August Schmücking
By Knight Bro
atty

Patented Mar. 11, 1930

1,750,364

UNITED STATES PATENT OFFICE

AUGUST SCHMÜCKING, OF ESSEN, GERMANY, ASSIGNOR TO FRIED. KRUPP AKTIEN-GESELLSCHAFT, OF ESSEN-ON-THE-RUHR, GERMANY

SEPARATOR DRUM

Application filed October 19, 1928, Serial No. 313,608, and in Germany October 28, 1927.

The invention relates to separator drums fitted with a filter and has for its object to obviate the difficulties arising with the hitherto known separator drums in inserting and exchanging the filter cloth. This object is primarily obtained by the fact that the abutting surface for the filter cloth, of the filter cloth carrier, which surface further serves as fitting surface for this carrier, has a tapering shape.

An embodiment of the subject-matter of the invention is illustrated by way of example in the drawing, the parts not entering into consideration for the invention being omitted.

In this drawing

Figure 1:
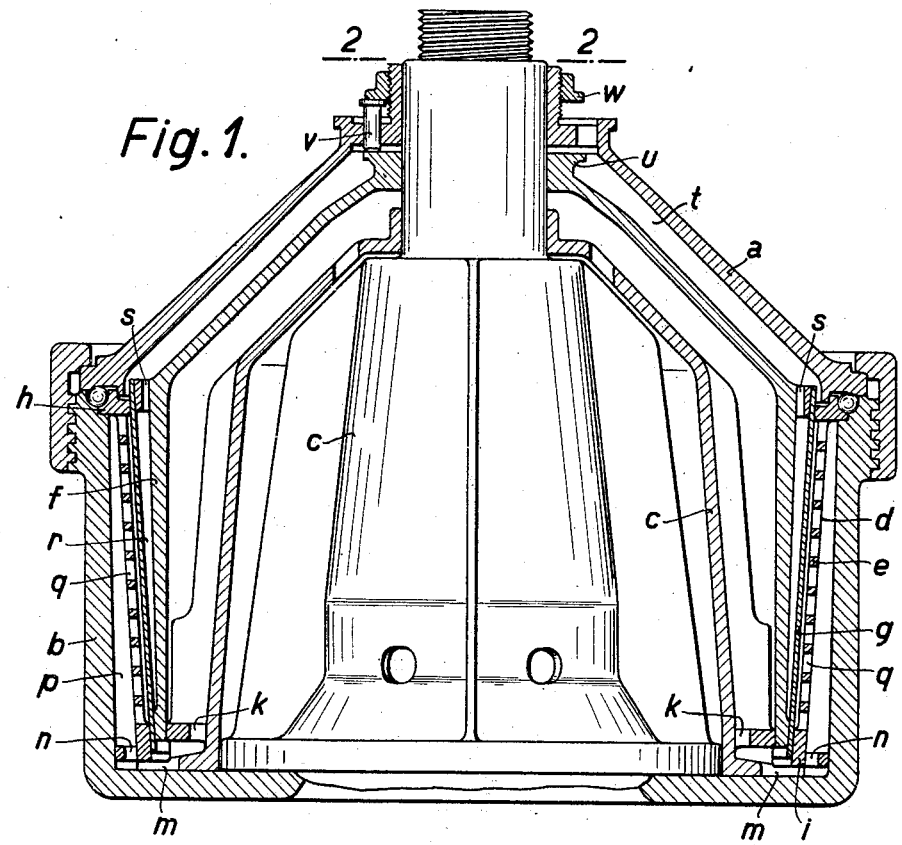
Figure 1 is a vertical section, partly in elevation, of the separator drum.
Figure 2:
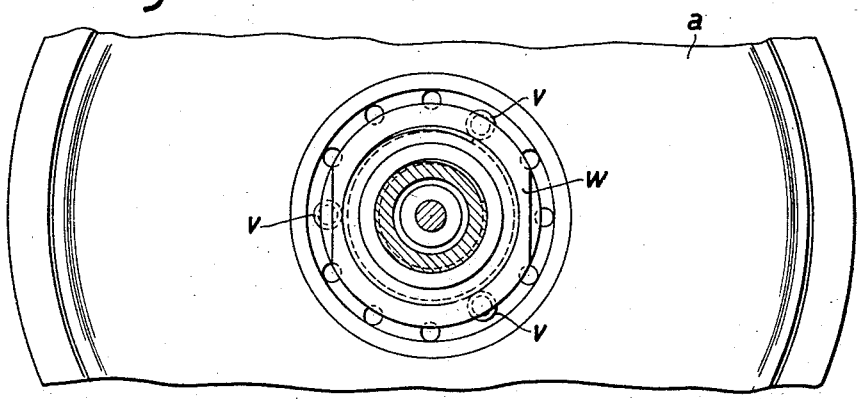
Figure 2 is the section on line 2—2 of Figure 1, seen from the top and partly broken off.

The casing $b$ closed by a cover $a$, of the separator drum has mounted in it several bladed cones $c$ that form subsequent chambers, and a filter member $d$. This latter consists of a perforated filter drum $e$, a filter cloth carrier $f$, and a filter cloth $g$. As indicated above, the invention primarily consists in the fact, that the abutment provided on the filter cloth carrier $f$ for the filter cloth $g$ has a tapering shape. The filter drum $e$ has likewise a tapering shape enlarging from bottom to top. It carries an upper and lower inwardly projecting annular rib $h$ and $i$, respectively, against which the filter cloth $g$ is pressed. The latter is thus fixed only on its upper and lower edge so that its whole remaining surface is at disposal for the passage of the liquid to be filtered. The liquid passes from the last blade chamber through openings $k$, $m$, $n$ into the outer annular chamber $p$ and through bores $q$ of the drum $e$, the filter cloth $g$ and grooves $r$ and bores $s$ provided on the filter cloth carrier $f$ into the free space $t$ below the cover $a$, and flows off therefrom. Owing to the tapering shape of the respective abutting surfaces, the filter cloth $g$ can easily be put on the filter cloth carrier $f$ and exchanged.

The invention further consists in employing peculiar means for pressing the filter cloth carrier and the filter cloth against the filter drum $e$. On its upper end the carrier $f$ has a tapering extension that subsides into an annular plate $u$. Three presser bolts $v$ passing through bores of cover $a$ rest on this plate $u$ and can be firmly pressed against it by a nut $w$ adjustable on the cover $a$. As clearly to be seen, the filter cloth carrier $f$ with the filter cloth $g$ is thereby pressed in a very simple manner against the filter drum $e$, so that a tight closure on the ribs $h$ and $i$ of the drum $e$ is obtained.

What I claim and desire to secure by Letters Patent, is:—

1. A separator drum of the class described comprising a shell, a filter cloth carrier arranged therein, a filter cloth arranged between said carrier and said shell, tapering annular faces at the top and bottom of said carrier and corresponding counter faces on said shell, said faces being adapted to clamp said filter cloth between them.

2. A separator drum of the class described comprising a shell, a filter cloth carrier arranged therein, a filter cloth arranged between said carrier and said shell, tapering annular faces at the top and bottom of said carrier and corresponding counter faces on said shell, said faces being adapted to clamp said filter cloth between them, and means for exerting an axial pressure on said carrier in the clamping direction.

3. A separator drum of the class described comprising a shell, a filter cloth carrier arranged therein, a filter cloth arranged between said carrier and said shell, tapering faces on said carrier and counter faces on said shell, said faces being adapted to clamp said filter cloth between them, said shell having a threaded portion, and a nut thereon adapted to exert an axial pressure on said carrier in the clamping direction.

4. A separator drum of the class described comprising a shell, a filter cloth carrier arranged therein, a filter cloth arranged between said carrier and said shell, tapering faces on said carrier and counter faces on said shell, said faces being adapted to clamp said filter cloth between them, said shell having a threaded portion, and a nut thereon, presser bolts arranged on said shell between said nut and said carrier and adapted to transmit axial pressure exerted upon them by turning said nut, to said carrier in the clamping direction.

The foregoing specification signed at Cologne, Germany, this 2nd day of October, 1928.

AUGUST SCHMÜCKING.